US007648417B2

(12) United States Patent
Sonn

(10) Patent No.: US 7,648,417 B2
(45) Date of Patent: Jan. 19, 2010

(54) GAME SYSTEM BASED ON SELECTION OF FINAL TWO CONTESTANTS

(75) Inventor: David Sonn, Wayne, PA (US)

(73) Assignee: Dot Holdings, LLC, Wayne, PA (US)

( * ) Notice: Subject to any disclaimer, the term of this patent is extended or adjusted under 35 U.S.C. 154(b) by 489 days.

(21) Appl. No.: 11/532,285

(22) Filed: Sep. 15, 2006

(65) Prior Publication Data

US 2008/0070653 A1    Mar. 20, 2008

(51) Int. Cl.
*A63F 9/24*    (2006.01)
(52) U.S. Cl. .......................................... 463/42; 463/16
(58) Field of Classification Search .................. 463/12, 463/13, 21, 25, 30, 31, 42, 16; 700/91; 273/269, 273/139
See application file for complete search history.

(56) References Cited

U.S. PATENT DOCUMENTS

| 6,092,806 | A  * | 7/2000 | Follis ....................... 273/138.1 |
| 6,443,838 | B1 * | 9/2002 | Jaimet .......................... 463/16 |
| 6,688,978 | B1 * | 2/2004 | Herman ........................ 463/25 |
| 2004/0009816 | A1 * | 1/2004 | Miller .......................... 463/42 |
| 2004/0157684 | A1 * | 8/2004 | Craven, Jr. .................. 473/415 |
| 2004/0204217 | A1 | 10/2004 | Herman |
| 2004/0229675 | A1 | 11/2004 | Cannella |
| 2005/0288101 | A1 * | 12/2005 | Lockton et al. ................ 463/40 |
| 2006/0079312 | A1 * | 4/2006 | Penrice ......................... 463/17 |
| 2006/0135253 | A1 * | 6/2006 | George et al. ................. 463/25 |
| 2006/0154750 | A1 * | 7/2006 | Williams et al. ............. 473/415 |
| 2007/0244585 | A1 * | 10/2007 | Speiser et al. ................. 700/91 |

FOREIGN PATENT DOCUMENTS

| WO | 2004015544 | 2/2004 |
| WO | 2006017877 | 2/2006 |

* cited by examiner

*Primary Examiner*—James S McClellan
(74) *Attorney, Agent, or Firm*—Knobbe, Yoshida & Dunleavy, LLC

(57) ABSTRACT

A system and method for conducting a game with two or more participants that provides selections of the final two contestants for a particular contest. In the game, at least one winning participant is determined by comparing each participant's selections of the final two contestants to the actual final two contestants in the contest. Participants may also provide an indication of the first place contestant from among the selected final two contestants. Ties may be broken by comparing each participant's selection of a first place contestant to the actual first place contestant in the contest. Also described is a system for implementation of the method including means for carrying out the steps of the method. The method and system provide a fun, straightforward game that can be adapted to a wide variety of contests, be played by a large number of participants and be implemented over the World Wide Web.

20 Claims, 3 Drawing Sheets

GAME SYSTEM BASED ON SELECTION OF FINAL TWO CONTESTANTS

BACKGROUND OF THE INVENTION

1. Technical Field

The present invention relates to a game format. More specifically, the present invention relates to a game format based on the concept that two or more participants attempt to select the final two contestants of a specific contest.

2. Description of the Related Art

Many popular games require only a minimal commitment by the participant. Another factor that frequently figures in the popularity of a game or contest is the ability of the participants to follow along with the game or contest and support their selection.

In the field of horse racing, there are a variety of different wagers available to wagering participants. One of these wagers is commonly referred to as an exacta wager. In the case of an exacta wager, the wagering participant must correctly select the two horses that will finish first and second in a particular race and the correct finishing order of the two horses. A winner is declared and a prize is awarded only if all of the selections are correct. As a result, if no wagering participant selects all of the correct selections, no winner is declared and no prize is awarded. In some cases, such as in a betting pool or a game where it is desirable to select at least one winner, the possibility that no winner will be declared may be considered unacceptable.

It would be advantageous therefore to provide a gaming system and method, wherein the participants select the first and second place contestants for a contest, in which method at least one winner is always declared.

It would be advantageous therefore to provide a gaming system and method, wherein the participants select the first and second place contestants for a contest, in which winning could be achieved without predicting the correct order of finish.

It would also be advantageous to provide a gaming system and method, wherein the participants select the first and second place contestants for a contest, in which method the participants are permitted to make at least one selection after the contest has begun, with the option of starting a game while the contest has already started.

It would also be advantageous to provide a gaming system and method which combines ease of participation by the participants, with the excitement of each participant being able to follow along with an event, contest or series of events to determine which participant is the winner of the game.

In addition, it would also be advantageous to provide a gaming system and method for which it is easy for any participant to determine whether they have won or lost, based on publicly available information about a contest, event or series of events.

In order to gain the maximum amount of participant draw, it would also be advantageous to provide such a gaming system or method with simple rules to increase the number of participants including first time participants.

It would also be advantageous to provide a game that requires little time commitment unlike many popular "fantasy" games, that require a sizeable time commitment.

One or more of these and other objects and advantages of the invention may be provided by certain of the embodiments of the invention described herein.

SUMMARY OF THE INVENTION

In a first embodiment the present invention provides a gaming system including an information distributor for distribution of information about a contest to potential participants. The system also includes an input device for receiving participant selections for the final two contestants of a contest and an indication of the finishing order of the final two contestants. The game system includes a storage device for storing participant's selections and a comparison device for comparing the participants' selections of the final two contestants to the final two contestants of the contest to determine at least one winner based the comparison.

In an alternative embodiment of the gaming system, the input device requires the input of at least one selection by a first deadline and the input of at least one additional selection by a second, different deadline. For tiebreaker purposes, a third deadline may be used for selecting the order of finish of the first two selections. In another embodiment of the gaming system, the comparison device determines at least one winner even if no participant in the game provided all correct selections.

In a further embodiment, the present invention provides a gaming method involving the selection of the final two contestants of a contest by the participants in the game. In the method, available selections for the game are distributed to one or more potential participants. Selections of the final two contestants for a particular contest are then received from each game participant. An indication of the finishing order of the final two contestants is also received from each game participant. The selections of the final two contestants from each of said participants are compared to the final two contestants of the contest. The indication of the finishing order from the participants is then used to determine the winning participant or participants, if necessary, by comparing it to the actual finishing order of the contest.

These and other features, objects and advantages of the present invention will become apparent from the following detailed description of illustrative embodiments thereof, which is to be read in connection with the accompanying drawings.

DETAILED DESCRIPTION OF PREFERRED EMBODIMENTS

Figure 1A:
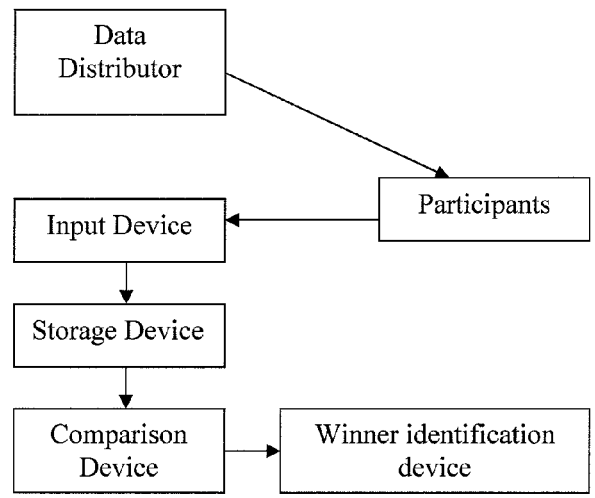
FIG. 1A depicts one embodiment of a gaming system in accordance with the present invention.
Figure 1B:
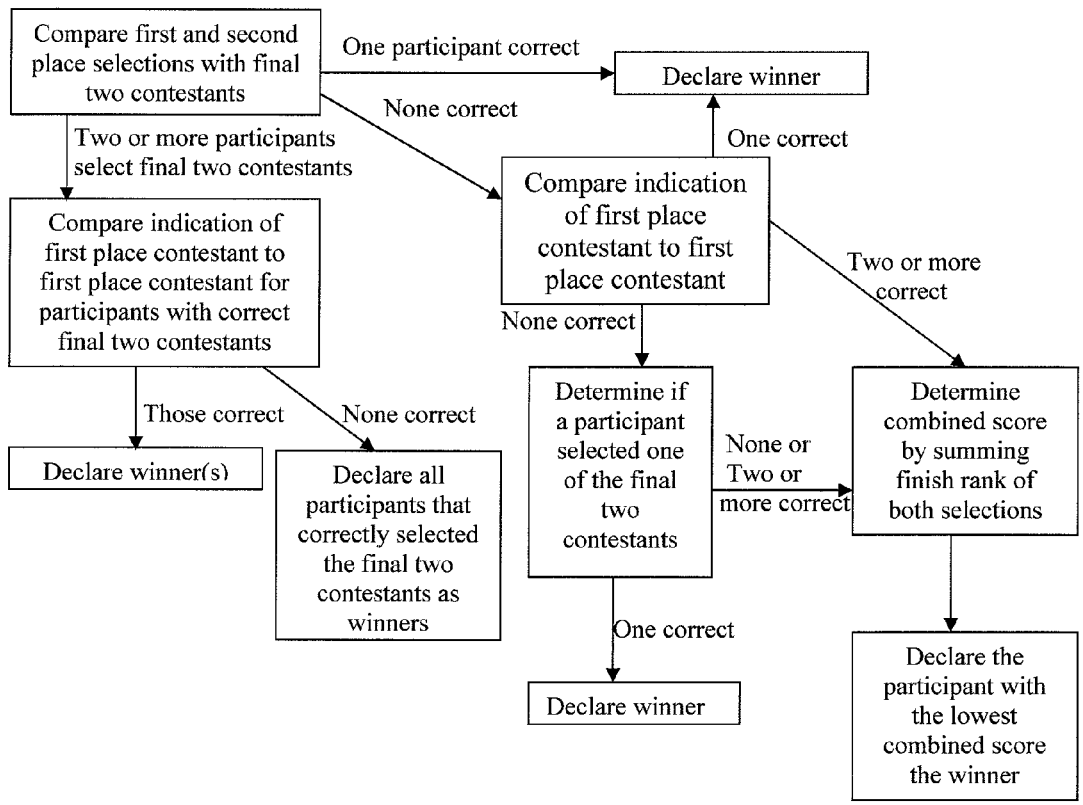
FIG. 1B depicts one embodiment of a comparison device for declaring a winner in accordance with the present invention.

The method of the present invention could be utilized in person at a designated location, in the form of a pool, or could be incorporated into software operating on a general purpose computer, gaming machine, or kiosk operating independently or networked with other general purpose computers, gaming machines, or kiosks. For example, in one optional embodiment, the method of the present invention could be embodied in software based at a server communicating with participants' general-purpose computers over the World Wide Web. Similarly, in an alternate optional embodiment, the method could be incorporated into software residing on a plurality of terminals, such as gaming machines, kiosks, or general-purpose computers communicating over a network such as a local area network ("LAN") or wide-area network ("WAN"). The invention also includes software adapted to implement the various methods of the present invention.

The present invention provides a unique game format to be played by any size group of people. The object of this game is for participants to correctly select the final or top two contestants of a specific contest, without necessarily correctly predicting the order of finish. As used herein, "final two contestants" and "top two contestants" refer collectively to the first and second place finishers in a particular contest.

The method of the present invention applies to competition events of the type with a finite number of competitors which are hereinafter referred to as "contests." For example, contests may include tournaments, such as golf or tennis tournaments, or a set of competitive games, such as the National Collegiate Athletic Association® ("NCAA") basketball tournament, a season or subset of a season of National Football League® games. It is also contemplated that the competitors in the contests of the present invention could be individuals, teams, individual members of teams, or the like. Examples of contests having finite numbers of competitors that could be used with the system and method of the present invention include, but are not limited to, reality television show contests (American Idol™, Survivor™, Big Brother™, Apprentice™), all major, sports team championships (The Major League Baseball or Little League World Series™ competition, the NBA™ Championship competition, the Stanley Cup competition™, etc.), any type of bracketed tournament (NCAA™ basketball, tennis, chess, etc.), professional golf tournaments (the Masters™, the U.S. Open™, etc.) horse races (the Kentucky Derby™, the Preakness™, etc.), car races (the Daytona 500™, the Indy 500™, etc.), Olympic™ events (100 meter dash, ice skating, etc.), track and field events, ice skating events, rowing events, etc., and political contests such as the presidential election, primaries, and party nominating contests. Simply put, this format can be used for any event that starts with more than two competitors and concludes with, or reaches a point at which, there are definitive first and second place contestants.

Example of the Invention

Figure 2:
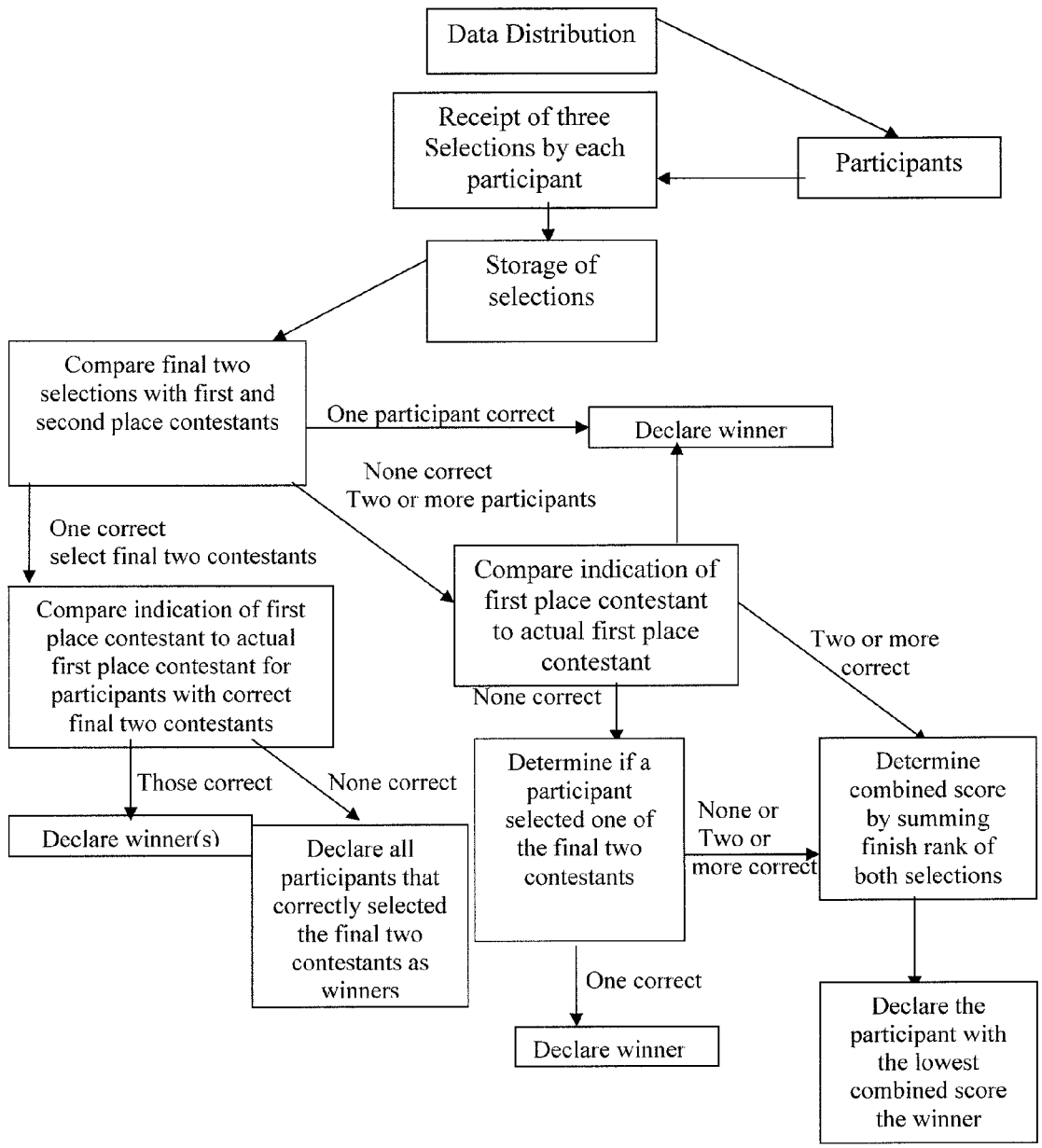
FIG. 2 is a flow chart depicting one embodiment of a method in accordance with the present invention.
Figure 3:
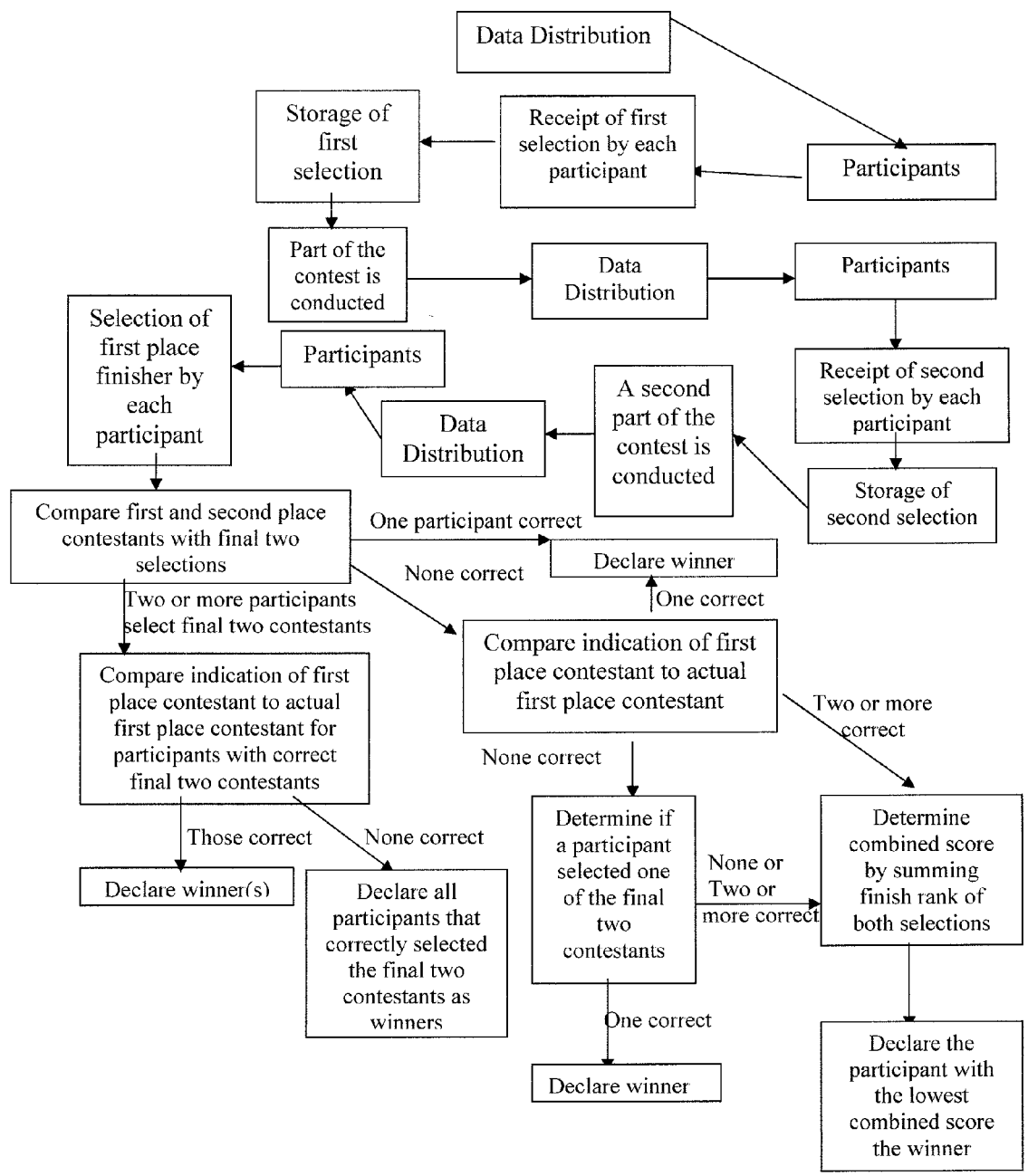
FIG. 3 is a flow chart depicting a second embodiment of a method in accordance with the present invention which employs a plurality of different selection deadlines.

This is an example of the game format using professional football to illustrate how the game is played and won. This example of the gaming method is illustrated schematically in FIG. 2.

A. How to Play

Participants first choose one team to reach the final two contestants Participants then choose a second team that will reach the final two contestants. Of the two teams selected, the participant then provides an indication of the finishing order of the two teams.

B. How to Win

1. Both Selected Teams Reach the Final Two

If a single participant correctly selects the two contestants that reach the final two contestants, regardless of which contestant wins, that participant may be declared the sole winner and the game is over. If two or more participants correctly select the final two contestants, a tiebreaker may be implemented based on which participant or participants correctly indicated the finishing order of the final two contestants. If there are multiple participants that correctly selected the final two contestants and the finishing order of the final two contestants, or there is no participant that correctly selected the final two contestants and the finishing order of the final two contestants the game may end with multiple winners.

2. $1^{st}$ Tie Breaker: Correctly Select the Champion

If no participant correctly selected both teams to reach the final two contestants, and only one participant correctly selected the first place contestant, that participant will be declared the winner and the game is over. If no participant correctly selected both teams to reach the final two contestants and two or more participants correctly selected the first place contestant, the participant with the lowest combined ranking score, may be declared the winner.

Combined ranking score is defined as the sum of the finishing position of each of the two teams selected by a participant. If multiple participants have the same combined ranking score, they may be declared joint winners and the game is over.

3. $2^{nd}$ Tie Breaker: Best Combined Ranking Score—Must have a Team in the Final Two to Qualify If no participant correctly selects the final two contestants and no participant correctly indicates the first place contestant, the participant that correctly selects one of the final two contestants and has the lowest combined ranking score may be declared the winner and the game is over. If under these circumstances multiple participants selected one of the final two contestants and have the same combined ranking score, they may be declared joint winners and the game is over.

4. Final Tie Breaker: Best Combined Ranking Score.

If no participant correctly selects one of the final two contestants, the participant with the lowest combined ranking score will be declared the winner. If no participant correctly selected one of the final two contestants and multiple participants have the same combined ranking score, they will be declared joint winners and the game is over.

The indication of the finishing order of the final two contestants and/or the indication of the first place contestant may be given in any suitable form. The preferred method is to require each participant to select a winner of the contest from among the final two contestants that were selected by that participant. However, it is also possible to allow each participant to place the final two contestants in a particular order as part of the selection process, or to have the participant select the second place contestant, in which case the first place contestant can be determined by elimination. All of these permutations are within the scope of the present invention and are considered to be an indication of the finishing order of the final two contestants.

Several variations on the basic concept of the game, as exemplified in the example, are possible. Some of the possible variations are described below.

Variation of Selection Deadlines

Selections can be initiated and closed at any time prior to determination of the first two contestants and/or the final finishing order. For example, all selections can be made prior to the start of a contest, during the contest or any combination thereof. In one embodiment, all deadlines can be set to expire before the contest starts. Alternatively, all deadlines can be set to expire at one or more points prior to and/or during the contest based on a specific time period, date or occurrence of a specific event. Alternatively, all deadlines can be set to expire at one or more points prior to, during, or after the contest.

Multiple Selection Deadlines

In a typical game in accordance with the present invention, at least three selections are required, two selections for the top two contestants and an indication of the finishing order or first place contestant. One or more selections can be required by different deadlines. For example, a participant may be require to select one of the final two contestants prior to the initiation of the contest, a second of the top two contestants at some point during the contest and to select the first place contestant at the same time or even at some later time dictated by a third deadline.

The type of contest and anticipated number of entries can be used to determine the best approach for a particular contest. For example, all three selections for the Men's NCAA Basketball Tournament™ could be required prior to a single deadline, e.g. prior to the first game of the tournament. Conversely, for professional golf's Masters Tournament™, the first selection could be required before the tournament begins, the second selection could required prior to the second round of the tournament, and the final selection could be required prior to the third round of the tournament. Such variations may be used to encourage participants of the game to closely follow the tournament in order to be in a position to make informed selections and improve their chances of being declared the winner.

No Identical Sets of Selections Permitted

In order to reduce the probability of joint winners, and/or force a wider array of selections, this option will not allow more than one participant to have the same set of selections for the final two finishers and the indication of the finishing order. This option can be optimally implemented in games when all selections are due at the same deadline since otherwise, certain participants could be left with no possible final selection or opportunity to continue playing. Also, this option is best used for an event with many realistically probable scenarios for final contestants, such as golf and auto racing, and/or when very few participants are expected for a particular game.

Alternatively, a partial variation of this option can be used whereby participants are not permitted to select at least a pair of the same selections, but multiple participants would be allowed to select, for example, the same first place contestant to thereby reduce the potential for participants being left with no opportunity to continue playing.

Revealing Participants' Selections

Optionally, participants' selections can be revealed prior to the conclusion of the contest to allow other participants to know which participants have a chance of winning as the game progresses. When using multiple selection deadlines, exercising the option of revealing or not revealing participants' selections prior to one or more of the selection deadlines can be employed to influence the strategy of participants in making their second or subsequent selections.

In one embodiment, the games, as described above, may be offered via a website interface on the World Wide Web. Participants may create unique accounts for participation and can be granted access from any World Wide Web portal. This approach allows for selections to remain confidential and for the manager of the game to control distribution of selection information. This approach also provides the ability to allow participants to change their selections until a deadline passes since the interface can be set to lock-in selections at the deadline.

Optionally, the game system can provide the opportunity, for those interested in running a game, the ability to easily set up, customize and manage their own game using the World Wide Web interface. The game system will record and distribute information about selections, as required, and determine the winners based on a set of rules for that particular version of the game. The web site manager may globally manage the game system such that individual participants or managers of a custom game need not concern themselves with determination of the winners.

The method of the present invention may include the steps of collecting information about upcoming contests, and providing information to potential participants to facilitate selection of contestants in the upcoming contests. The step of choosing an amount to wager may also be included but including a wager or prize is not a requirement of the game.

In the case of joint winners, the prize may be carried over to a subsequent game and the step of determining a prize based may include determining the prize including the carry over of prizes and/or winning contestants from prior games for which there was no single winner. The step of making selections may be performed randomly by a computer or may be performed as a game of skill by making selections based on an independent information source, which provides information relevant to the potential outcome of the contest.

The present method could be implemented as a wagering game, such as at a sports book or in a sports pool. Alternatively, the method could be implemented as a promotion, contest, or the like in which participants are not required to make a wager. A prize or prizes can be offered to the winners.

When used in conjunction with an event featuring head to head competitions which result in elimination of one of the competitors from the event, e.g. the NCAA™ Championship, the participants may optionally be restricted from selecting teams playing against each other in a particular round or a particular bracket to prevent early elimination of participants from the game. Alternatively, when used in conjunction with an event with a tournament-type format, such as the NCAA™ Championship, a participant may be allowed to select more than two competitors from the set of competitors, which selections must include the final two competitors.

In optional embodiments, any conventional tie-breaking procedure can be used to break ties in the case of joint winners. Such tie breaking procedures may include random determination of the winner or determination of the winner based on additional selections or information provided by the winner at some point during the game. In another optional embodiment, a predetermined number of participants are rewarded. Optionally, only one participant is rewarded. Alternatively, a fixed number of the top participants are selected as winners with a reward going to each of the winners.

In an optional embodiment in which participants wager to participate in the contest, the wagers are optionally pooled. In such an optional embodiment, the manager of the game may optionally take a percentage of the pooled wagers and divide the remaining pool among the winning participants.

Having described preferred embodiments for a gaming method based on the top two contestants and their finishing order (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A gaming method comprising the step of:
   (a) distributing available selections for the game from at least one server to one or more potential participants via at least one device selected from the group consisting of a computer, a gaming machine and a kiosk, said device being operatively connected to said at least one server,
   (b) receiving at said at least one server a first selection of a contestant for a particular contest from game participants via said at least one device,
   (c) allowing at least a portion of said contest to be conducted after receiving said first selection of a contestant from game participants,
   (d) subsequently receiving at said at least one server a second selection of another contestant for said contest from game participants via said at least one device,
   (e) receiving an identification of a first place contestant from among the participants' first and second selections,
   (f) determining an actual finish position in said contest of said first and second selections from said participants; and
   (g) always determining at least one winning participant based only on said determining step (f).

2. A gaming method as claimed in claim 1, wherein
   a further portion of said contest is conducted after receiving at said at least one server the second selection of another contestant for said contest from game participants via said at least one device
   before receiving at said at least one server the identification of a first place contestant from game participants.

3. A gaming method as claimed in claim 2, wherein step (b) is initiated after at least a portion of said contest has been conducted.

4. A gaming method as claimed in claim 2, wherein said first selections of game participants are revealed to game participants prior to said step of receiving second selections from game participants.

5. A gaming method as claimed in claim 2, wherein said first and second selections of game participants are revealed to game participants prior to said step of receiving the identification of a first place contestant from game participants.

6. A gaming method as claimed in claim 1, wherein step (b) is initiated after at least a portion of said contest has been conducted.

7. A gaming method as claimed in claim 1, wherein said first selections of game participants are revealed to game participants prior to said step of receiving second selections from game participants.

8. A system for the administration of a game comprising:
   a. at least one server for distribution of available selections for the game to one or more potential game participants,
   b. an input device selected from the group consisting of a computer, a gaming machine and a kiosk, for receipt of selections for the game from one or more game participants,
   c. a storage device operatively associated with said server for storing selections made by game participants, and
   d. a comparison device for carrying out the following steps:
      (i) determining an actual finish position in said contest of said first and second selections from said participants; and
      (ii) always determining at least one winning participant based only on said determining step (i),
   wherein said input device receives a first selection of a contestant for a particular contest from game participants, waits for at least a portion of said contest to be conducted after receiving said first selection of a contestant from game participants and subsequently receives a second selection of another contestant for said contest from game participants after said portion of said contest has been conducted.

9. A gaming method comprising the steps of:
   (a) distributing available selections for a game from at least one server to one or more potential participants via at least one device selected from the group consisting of a computer, a gaming machine and a kiosk, said device being operatively connected to said at least one server,
   (b) receiving a first selection of a contestant from game participants, a second selection of a contestant from game participants and an identification of a first place contestant from among the participants' first and second selections for a particular contest from game participants at said at least one server,
   (c) determining an actual finish position in said contest of said first and second selections from said participants,
   (d) determining whether one or more game participants selected in step (b) both actual first and second place finishers of said contest, and, if only one game participant selected the actual first and second place finishers of said contest, declaring said game participant that selected the actual first and second place finishers of said contest the winner, or if two or more game participants selected both actual first and second place finishers of said contest, then
   (e) determining whether one or more same participants from among the two or more game participants that selected both actual first and second place finishers of said contest, also identified the actual first place contestant of said contest, if so, declaring said one or more game participants that selected the actual first and second place finishers of said contest and identified the actual first place finisher of said contest the winner, if not, declaring all game participants that selected both actual first and second place finishers of said contest joint winners;
   if no game participant selected both actual first and second place finishers or said contest, then
   (j) determining whether one or more game participants selected one of the actual first and second place said contest, and, if only one game participant selected one of the actual first and second place finishers in said contest, declaring the game participant that selected one of the actual first and second place finishers in said contest the winner, if two or more game participants selected one actual first and second place finishers in said contest, then
   (g) determining a combined ranking score for each of the two or more game participants that selected one of the actual first and second place finishers in said contest, and declaring at least one game participant with a lowest combined ranking score the winner; and
   (h) if no participant selected at least one of the actual first and second place finishers in said contest, determining the combined ranking score for all game participants and declaring at least one game participant with a lowest combined ranking score the winner.

10. A gaming method as claimed in claim 9, wherein said step (b) is initiated after at least a portion of said contest has been conducted.

11. A gaming method as claimed in claim 9, wherein step (b) is completed after at least a portion of said contest has been conducted.

12. A gaming method as claimed in claim 9, wherein no two participants are permitted to make an identical set of first and second selections and identification of a first place contestant.

13. A gaming method as claimed in claim 9, wherein no two participants are permitted to make an identical set of first and second selections and identification of a first place contestant.

14. A system for the administration of a game comprising:
 a. at least one server for distribution of available selections for the game to one or more potential game participants,
 b. an input device selected from the group consisting of a computer, a gaming machine and a kiosk, for receipt of first and second selections for the game from one or more game participants,
 c. a storage device operatively associated with said server for storing selections made by game participants, and
 d. a comparison device for carrying out the following steps;
  (i) determining an actual finish position in said contest of said first and second selections from said participants,
  (ii) determining whether one or more game participants selected in step (b) selected both actual first and second place finishers of said contest, and, if only one game participant selected the actual first and second place finishers of said contest, declaring said game participant that selected the actual first and second place finishers of said contest the winner, or if two or more game participants selected both actual first and second place finishers of said contest, then
  (iii) determining whether one or more game participants from among the two or more game participants that selected both actual first and second place finishers of said contest, also identified the actual first place contestant of said contest, if so, declaring said one or more game participants that selected the actual first and second place finishers of said contest and identified the actual first place finisher of said contest the winner, if not, declaring all game participants that selected both actual first and second place finishers of said contest joint winners;
  if no game participant selected both actual first and second place finishers of said contest, then
  (iv) determining whether one or more game participants selected one of the actual first and second place finishers in said contest, and, if only one game participant selected one of the actual first and second place finishers in said contest, declaring the game participant that selected one of the actual first and second place finishers in said contest the winner, if two or more game participants selected one of the actual first and second place finishers in said contest, then
  (v) determining a combined ranking score for each of the two or more game participants that selected one of the actual first and second place finishers in said contest, and declaring at least one game participant with a lowest combined ranking score the winner, and
  (vi) if no participant selected at least one of the actual first and second place finishers in said contest, determining the combined ranking score for all game participants and declaring at least one game participant with a lowest combined ranking score the winner.

15. A gaming method as claimed in claim 9, wherein step (b) comprises the steps of:
 receiving at said at least one server said first selection of a contestant for a particular contest from game participants via said at least one device,
 allowing at least a portion of said contest to be conducted, and
 subsequently receiving at said at least one server said second selection of another contestant for said contest from game participants via said at least one device.

16. A gaming method as claimed in claim 15, wherein said method further comprises the step of:
 allowing at least a further portion of said contest to be conducted after receiving at said at least one server the second selection of another contestant for said contest from game participants via said at least one device and
 subsequently receiving at said at least one server the identification of a first place contestant from game participants via said at least one device.

17. A gaming method as claimed in claim 16, wherein step (b) is initiated after at least a portion of said contest has been conducted.

18. A gaming method as claimed in claim 15, wherein step (b) is initiated after at least a portion of said contest has been conducted.

19. A gaming method as claimed in claim 16, wherein said first selections of game participants are revealed to game participants prior to said step of receiving the second selection from game participants.

20. A gaming method as claimed in claim 15, wherein said first selections of game participants are revealed to game participants prior to said step of receiving the second selection from game participants.

* * * * *

UNITED STATES PATENT AND TRADEMARK OFFICE
CERTIFICATE OF CORRECTION

PATENT NO. : 7,648,417 B2  Page 1 of 1
APPLICATION NO. : 11/532285
DATED : January 19, 2010
INVENTOR(S) : David Sonn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this

Sixteenth Day of November, 2010

David J. Kappos
*Director of the United States Patent and Trademark Office*